US006427202B1

(12) United States Patent
Richardson et al.

(10) Patent No.: US 6,427,202 B1
(45) Date of Patent: Jul. 30, 2002

(54) MICROCONTROLLER WITH CONFIGURABLE INSTRUCTION SET

(75) Inventors: David Alan Richardson, Chandler; Rodney Jay Drake, Phoenix, both of AZ (US)

(73) Assignee: Microchip Technology Incorporated, Chandler, AZ (US)

(*) Notice: Subject to any disclaimer, the term of this patent is extended or adjusted under 35 U.S.C. 154(b) by 0 days.

(21) Appl. No.: 09/304,745

(22) Filed: May 4, 1999

(51) Int. Cl.⁷ .................................................. G06F 9/30
(52) U.S. Cl. ........................................ 712/32; 712/248
(58) Field of Search ......................... 712/32, 211, 208, 712/247, 248

(56) References Cited

U.S. PATENT DOCUMENTS

| | | | |
|---|---|---|---|
| 4,167,778 A | | 9/1979 | Sipple .......................... 364/200 |
| 4,386,773 A | * | 6/1983 | Bronstein ..................... 345/567 |
| 5,619,408 A | | 4/1997 | Black et al. ................. 395/567 |
| 5,742,794 A | | 4/1998 | Potter .......................... 395/500 |
| 5,802,544 A | * | 9/1998 | Combs ........................... 711/5 |
| 5,859,991 A | * | 1/1999 | Narayan ....................... 712/204 |
| 5,918,035 A | * | 6/1999 | Van Praet ..................... 703/22 |
| 5,964,861 A | * | 10/1999 | Gabzdyl ....................... 712/23 |
| 6,002,876 A | * | 12/1999 | Davis .......................... 717/10 |
| 6,035,380 A | * | 3/2000 | Shelton ....................... 711/163 |
| 6,076,156 A | * | 6/2000 | Pickett ........................ 712/226 |
| 6,081,884 A | * | 6/2000 | Miller ......................... 712/204 |
| 6,141,740 A | * | 10/2000 | Mahalingaiah ............... 711/215 |

FOREIGN PATENT DOCUMENTS

| | | |
|---|---|---|
| EP | 0 726 516 | 8/1996 |
| GB | 2 136 998 | 9/1984 |

OTHER PUBLICATIONS

"Opcode Compare Facility"; Research Disclosure, GB, Industrial Opportunities, LTD., Havant, No. 315, p. 577, XP000134174, ISSN: 0374–4353, Jul. 1, 1990.

* cited by examiner

Primary Examiner—Eric Coleman
(74) Attorney, Agent, or Firm—Baker Botts L.L.P.

(57) ABSTRACT

An embeddable microcontroller is provided. The microcontroller has program memory for storing instructions. An instruction decoder feteches instructions, decodes them, and forwards them to an enabler. The enabler checks a status bit or consults a pre-defined lookup table to determine whether the instruction at hand should be executed. If the status bit is set to ENABLE, or the instruction appears on a list of enabled instructions, the decoded instruction is forwarded to the central processing unit for execution. Otherwise, if the status bit is set to DISABLE, or the decoded instruction does not appear on the pre-defined list of enabled instructions, then the instruction is not forwarded to the central processing unit, effectively disabling the instruction.

35 Claims, 8 Drawing Sheets

MICROCONTROLLER WITH CONFIGURABLE INSTRUCTION SET

CROSS REFERENCE TO RELATED PATENT APPLICATIONS

There are no applications related to the present application.

BACKGROUND OF THE INVENTION

1. Field of the Invention

The present invention relates generally to semiconductor microprocessors, a class of which is known as microcontrollers, that perform selective functions, and more particularly, to a microcontroller that selectively executes instructions.

2. Description of the Related Technology

The evolution of microprocessors into complex instruments and machines has led to sophisticated, fast real-time control capability. Large microprocessors of 16 or 32 bit capability with associated interrupt handler chips, programmable timer chips, ROM and RAM chips, have been replaced in many control function instances by single chip I/O microcontrollers with all peripherals embedded on the same chip with the microcontroller. Operation of the chip in an expanded mode enhances the versatility of all on-chip features.

Microcontrollers have a wide diversity of applications. In hand-held devices such as pocket pagers (beepers), the microcontroller is responsive to received characters, first to interpret them, then produce an audible or vibratory signal, to notify the user of an incoming message, and produce multiple alphanumeric messages on a suitable display such as an LCD. The microcontroller can recall from its internal memory any or all of the messages received in a given period of time. Among other instrumentation uses are those as meters and testers, capable of carrying out thousands of tests, each in a millisecond or less.

Other applications include keyboard controllers for personal computers, in which the microcontroller serves to off-load many tasks formerly handled by the processor, including continuous performance of numerous diagnostic procedures and notification to the processor if a problem is detected. Personal computer applications of microcontrollers include use in modems for command interpretation and data transmission, in printer buffers for high speed dumping of data in preparation for driving the printer at the appropriate speed, and in color plotters, copiers, electronic typewriters/word processors, cable television terminal equipment, lawn sprinkling controllers, credit card phone equipment, cellular telephones, fax machines, automotive applications such as engine control modules, anti-lock braking systems, automobile suspension control, keyless entry systems, and a host of other industrial and consumer applications.

Typically, a microcontroller includes, among other things, a CPU (central processing unit), a program memory from which the CPU fetches instructions, and a data memory (also called a register file in some architectures) which is readable and writable directly by the CPU. The CPU fetches an instruction from the program memory and addresses the data memory according to an address obtained through the instruction or through an indirect register. The CPU may also operate in conjunction with certain peripherals to perform the control function, including devices such as timers, signal ports, and baud rate generators, among others.

More recently, microcontrollers have been embedded into appliances, such as automobiles or coffee makers, and are used to control certain electromechanical devices within the appliance. Embedded control products are found in all market segments: consumer, commercial, PC peripherals, telecommunications (including personal telecom products), automotive and industrial. Most embedded control products must meet special requirements: cost effectiveness, low-power, small-footprint and a high level of system integration.

Typically, most embedded control systems are designed around a MCU which integrates on-chip program memory, data memory (RAM) and various peripheral functions, such as timers and serial communication. In addition, these systems usually require complementary serial EEPROM, display drivers, key pads or small displays. Variable parameter settings for the microcontroller, if any, are usually through the displays and key pads that are controlled by the operator.

In the prior art, microcontrollers include program memory that stores instructions that can be executed on, for example, a microprocessor. Normally, the variable length coded instructions that are stored in the program memory require multiple read statements in order to obtain the complete instruction, particularly on 8-bit processors. Once the complete coded instruction is obtained, it must be decoded before it can be executed. Consequently, the execution of an instruction requires three basic steps: fetch, decode, and execute.

Figure 1:
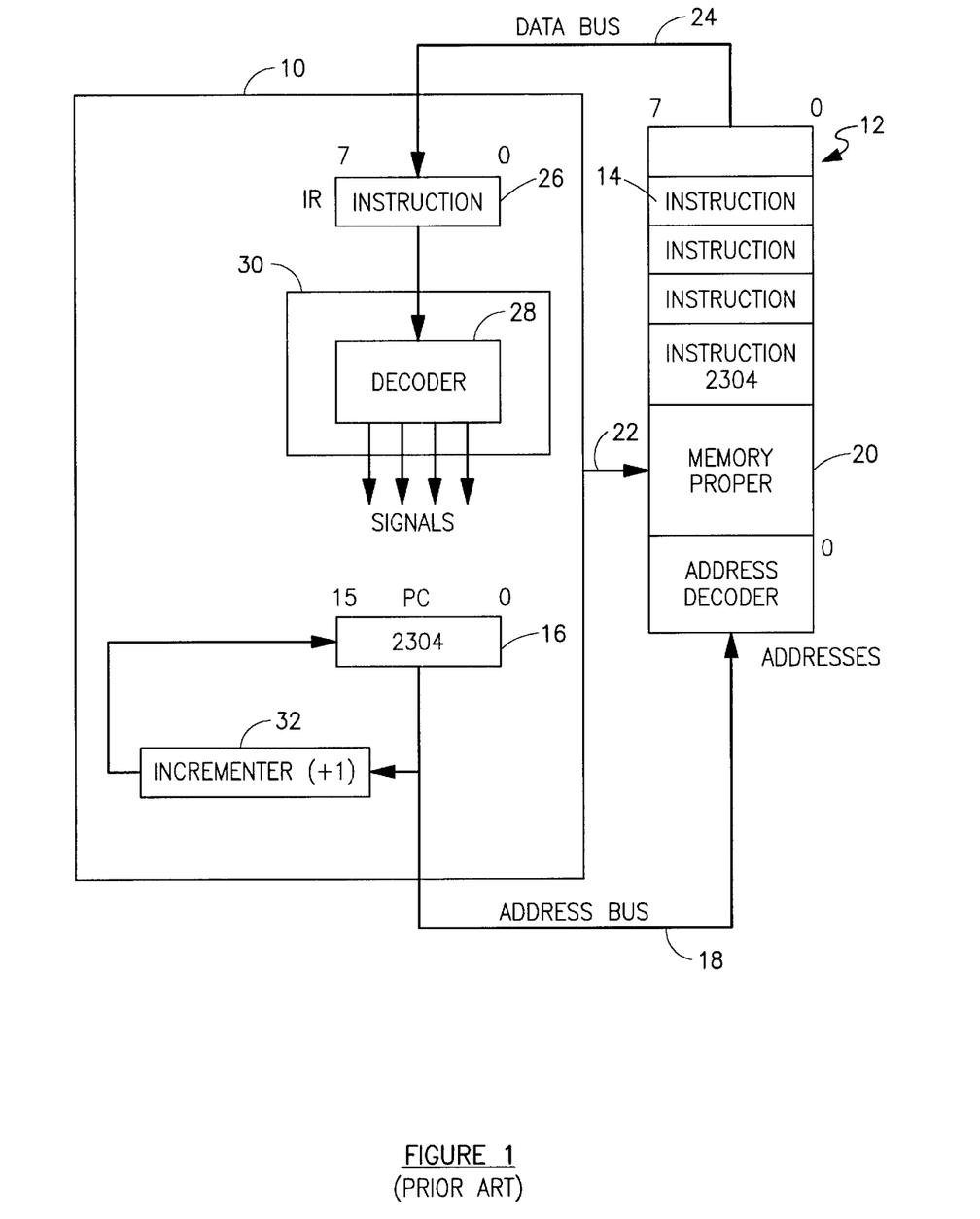
FIG. 1 is a schematic block diagram of a prior art microcontroller.

The instruction is first fetched from memory and transferred inside the microprocessor into a special register of the control unit called the instruction register (IR). Once in the IR, the fetched instruction is decoded by a decoder. Finally, the decoded instruction is executed. The appropriate sequence of signals is generated by the control logic unit, resulting in the appropriate data transfers and operations. The execution of an instruction is illustrated in FIG. 1. The microprocessor unit (MPU) chip 10 appears on the left, and a memory chip 12 (ROM or RAM) containing the program (instructions) 14 appears on the right.

The first phase is the instruction fetch: The contents of the program counter (PC) 16 are output to the address bus 18 and a memory location is selected, in the example shown in FIG. 1, memory location 2304 (designated by numeral 15 in FIG. 1). A read command 22 is then given to the memory 12. After a period of nanoseconds—corresponding to the memory read-time (or access-time)—the eight bits of data selected by this address 15 become available on the output pins (not shown) of the memory 20 and are propagated on the system's data bus 24 (in this case, from right to left). The data are gated inside the MPU chip 10 to the instruction register (IR) 26 of the control unit 30, thus completing the fetch cycle.

The two cycles that follow the fetch cycle are decode and execute. The IR 26 is decoded by the decoder 28 that is located within the control unit 30 control unit, usually via a programmable logic-array (PLA) (not shown), and the appropriate signals are generated by the control unit 30, resulting in instruction execution.

An instruction is not necessarily eight bits long. In fact, it generally uses one, two, three, or four words, i.e., 8, 16, 24 or 32 bits. When an instruction has more than eight bits, the control unit 30 must go back to the memory 20 and read the following byte or bytes successively into the IR 26.

The first word of the instruction always contains its opcode, i.e., the binary code that specifies the operation to be done. After decoding the opcode with the decoder 28, the control unit 30 "knows" whether or not it must go back to the memory 20 to fetch additional bytes.

Having described the sequence of events in the execution of a single instruction, we will now describe automatic sequencing, i.e., the sequential execution of instructions. A program is stored as a sequence of binary instructions 14 residing at successive addresses in the memory 20. Once an instruction has been fetched and executed, the program counter (PC) 16 must be updated so that the next instruction can be fetched and executed. The problem lies in updating the program counter 16. This problem is solved by adding an incrementer (or a decrementer depending on the convention used) to the PC 16. Thus, each time the PC 16 is used, (i.e., its contents are output) its value is automatically incremented (or decremented) and loaded back into the PC 16. The next time the PC 16 is used, it will be pointing to the next byte in memory, i.e., to the next instruction or to the next byte of a given instruction, if the instruction uses two bytes or more. This incrementer 32 is shown as +1 in FIG. 1.

Program instructions are stored sequentially (one after another) in the memory 20. However, instructions are not always executed in sequence. In order to take different actions based on the results of tests or decisions, different parts of the program may be executed. In this case, the next instruction to be executed is specified by the current instruction. Such an instruction, which inhibits the automatic sequencing mechanism, is called a branch instruction. The programmer can specify a branch or a jump to a specified memory address. Such an instruction will force a new value within the program counter 16.

Figure 2:
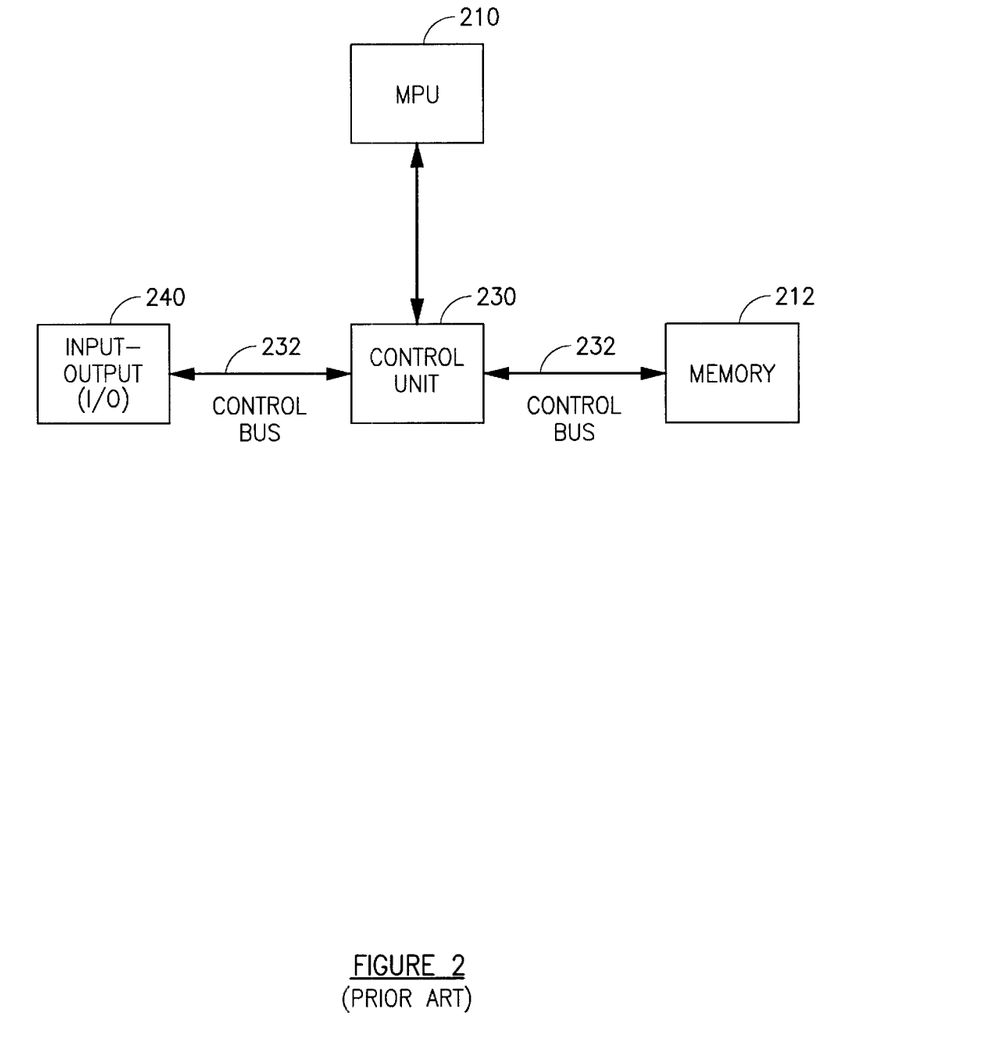
FIG. 2 is a schematic block diagram of a prior art microcontroller.

From a functional standpoint, the control unit 30 is in charge of sequencing the operation of the entire microprocessor system (as illustrated in FIG. 2). The control unit 230 generates synchronization signals and manages commands exchanged between the arithmetic logic unit of the MPU 210, the I/O 240, and the memory 212. The control unit 230 decodes, fetches, and executes instructions.

The control unit 230 communicates with the external world via input and output lines that make up the control bus 232. The control bus 232 is normally managed by the control unit 230.

Two main techniques are used to design a control unit 230: hard-wiring and microprogramming. Most control units for microprocessors are implemented using a microprogramming technique with a pre-defined instruction set. The sequencing of the control unit is accomplished by a specialized internal program called the microprogram. The microprogram defines the instruction set of the microprocessor and the way it is executed. The microprogram is stored in an internal ROM or PLA 212 inside the chip and is normally invisible to the user. Bit-slices are the only type of LSI chips that are normally user-microprogrammable (because control is external to the slices themselves). For all practical purposes, microprogrammed microprocessors are essentially hardwired, in that they cannot be modified by the user.

There is, therefore, a need in the art for a microcontroller that can be controlled, to some extent, by a user during operation of the microcontroller. There is a further need in the art for a microcontroller that is reconfigurable after it has been manufactured.

SUMMARY OF THE INVENTION

The above and other objects of the present invention are satisfied, at least in part by providing, in a microcontroller, a program memory, a decoder, a central processing unit, control logic, and an instruction enabler. The central processing unit is capable of executing instructions within a predefined instruction set. The microcontroller of the present invention optionally can be embedded into appliances or the like.

The microcontroller utilizes the program memory for storing instructions. The decoder fetches the stored instructions and decodes them. An instruction enabler is provided within the microcontroller under the control of the control logic. The instruction enabler receives at least one of the signals that are output by the decoder, i.e., at least one of the decoded instructions. In the preferred embodiment of the present invention, a status bit is checked by the enabler/disabler mechanism to determine whether or not the instruction is to be enabled. If, for example, the status bit is set to ENABLE, then the instruction is enabled, forwarded to the CPU, and execution then proceeds normally. Otherwise for example, if the status bit is set to DISABLE, then the instruction is disabled and is either skipped altogether or is substituted with a no-operation (NOP).

In alternate embodiments of the present invention, the enabler compares the received decoded instruction with a predefined list of special instructions kept by the control logic or the enabler itself, or, in the alternative, a list stored within program memory. If the received coded instruction is found on the list, then the instruction enabler forwards the (enabled) instruction to the central processing unit for execution, or, if the instruction is not found in the list, the decoded instruction is kept from the central processing unit, effectively disabling the instruction. In yet another alternate embodiment of the present invention, the control logic can accommodate hardware switches that affect the selective enablement or disablement of particular instructions within the instruction set. In still another alternate embodiment, software instructions, sent either to the core logic or to the enabler, or contained within the program memory, are used to selectively enable or disable specific instructions and allow the reconfiguration or alteration of behavior of the microcontroller after manufacture.

The present invention also allows a single microcontroller to combine the functionality of several microcontrollers with a common instruction set. The enabler can be set by the user at runtime to enable one or more instruction subsets in order to realize the desired functionality of the specific device. Thus, a single microcontroller can accommodate multiple functions while producing only one common microcontroller, thus reducing manufacturing costs. After production, simply enabling one or more of the instruction subsets in the universal microcontroller alters the subsequent behavior of the device.

One of the unique features of the present invention is the ability to disable certain instructions for security reasons. In some cases, instructions, such as table reads, can be disabled so that would-be crackers are unable to gain access to proprietary software stored in the program memory and/or the data memory. Similarly, selected instructions can be disabled so that, if the program memory or data memory is somehow corrupted, none of the corrupted "instructions" would be executed, rendering the defective device inert rather than allowing some potentially dangerous action to occur.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

The present invention is an apparatus, method and system for providing a microcontroller with the ability to execute or disable specific instructions, depending upon a variety of criteria. Multiple instruction subsets may be stored within the present invention. Execution of particular instruction subsets can be accomplished with predefined or run-time settings.

Figure 3:
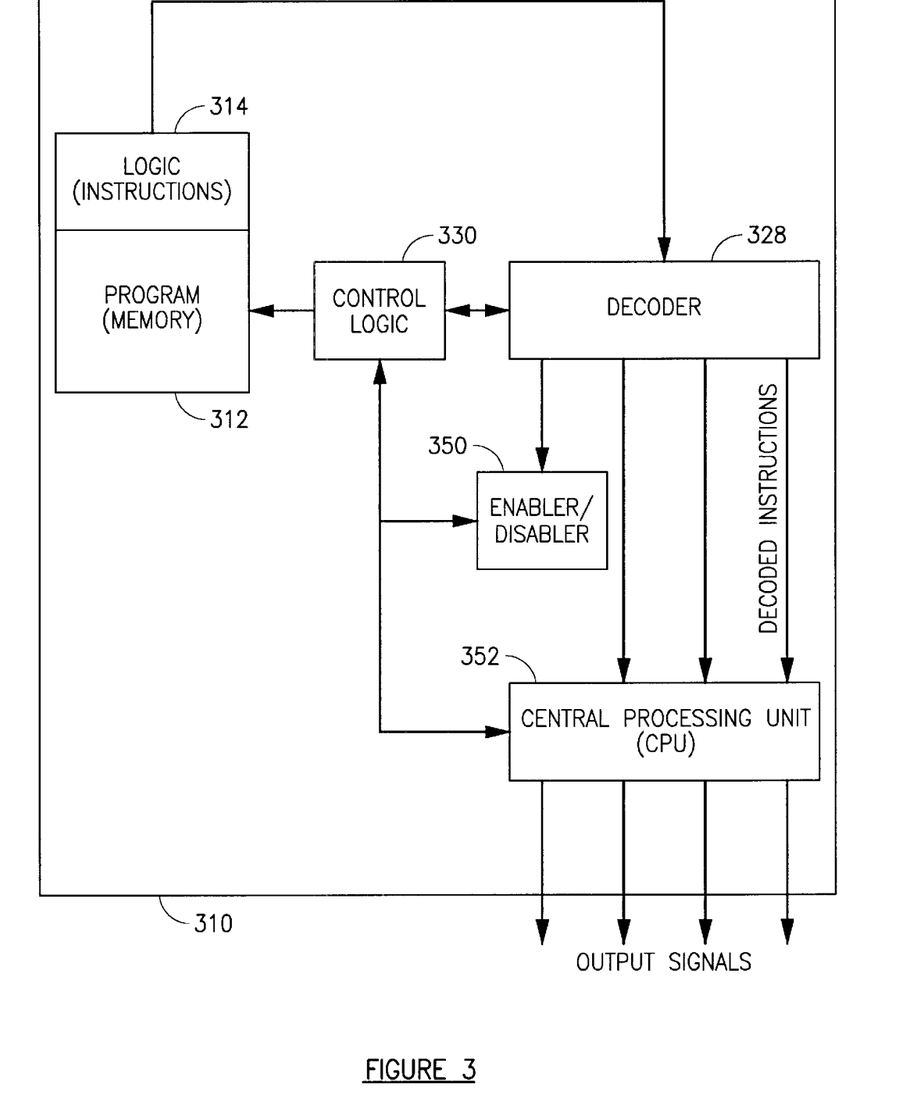
FIG. 3 is a schematic block diagram of a microcontroller of an embodiment of the present invention.

FIG. 3 illustrates the first embodiment of the present invention wherein a microcontroller central processing unit (CPU) 352 is associated and interacts with a program memory 312 in which software program instructions are stored. The CPU 352, via the control logic 330 and decoder 328, fetches instructions from the program memory for execution during operation of the microcontroller device 310. The decoder 328 can be a programmable-logic array (PLA) or similar device. Data resulting from the operation of the CPU 352 is output in the form of output signals by which an external system (not shown) is controlled. Control logic 330, for programming and other purposes, is constructed, arranged and adapted to interact with the memory 312, the decoder 328, the enabler 350, and the CPU 352. The various components are fabricated as part of the microcontroller device in a single semiconductor integrated circuit chip 310 by known wafer fabrication process technology.

Referring to the first embodiment as shown in FIG. 3, the enabler 350 is arranged in between one of the lines of decoded instructions from the decoder 328 that are input into the CPU 352. The enabler 350 intercepts at least one of the decoded instructions that are emitted by the decoder 328. The enabler 350 then compares the received decoded instruction with a predefined list of special instructions kept by the control logic 330. Alternatively, the same list may alternatively be stored within the program memory 312 or event within enabler 350, wherein enabler 350 could correctly be called a disabler 350.

In an alternate embodiment of the present invention, the microcontroller 310 can accommodate hardware switches that effect the selective enablement or disablement of particular instructions or instruction subsets within the entire instruction set. In yet another alternate embodiment, software instructions, sent either to the core logic 330 or to the enabler 350 or contained within the program memory 312, are used to selectively enable or disable specific instructions and allow the reconfiguration or alteration of behavior of the microcontroller after manufacture.

In yet another alternate embodiment, if the decoded instruction received from the decoder 328 is found on the list, then the instruction enabler 350 either: Forwards the (enabled) instruction to the central processing unit 352 for execution, or, if the instruction is absent from the list, the instruction is kept from the central processing unit 352, thereby disabling the instruction. The list itself may contain either: A list of instructions to be enabled or, alternatively, it may contain a list of instructions to be disabled. The list can be loaded into the control logic 330 or into the enabler 350. The list can also be loaded into a portion of the program memory 314 or a special purpose memory (not shown).

The list of enabled/disabled instructions can be generated by a software program that is executed by the central processing unit 352 at the startup of the microcontroller 310. This software program can be responsive to user-defined external settings or predefined internal settings that affect which of the instructions is enabled or disabled. One or more hardware switches can disable multiple instruction subsets and leave one or more instruction subsets enabled and vice-versa. As mentioned before, the list of instructions to which a particular instruction is compared may be composed of the enabled instructions or disabled instructions. If the list contains the enabled instructions, then the decoded instructions received by the enabler 350 that appear on the "enabled list" will be forwarded to the central processing unit 352 for execution. Likewise, if the list contains only disabled instructions, then the decoded instructions received by the disabler 350 that do not appear on the list it will be forwarded to the central processing unit 352 for execution.

Figure 4:
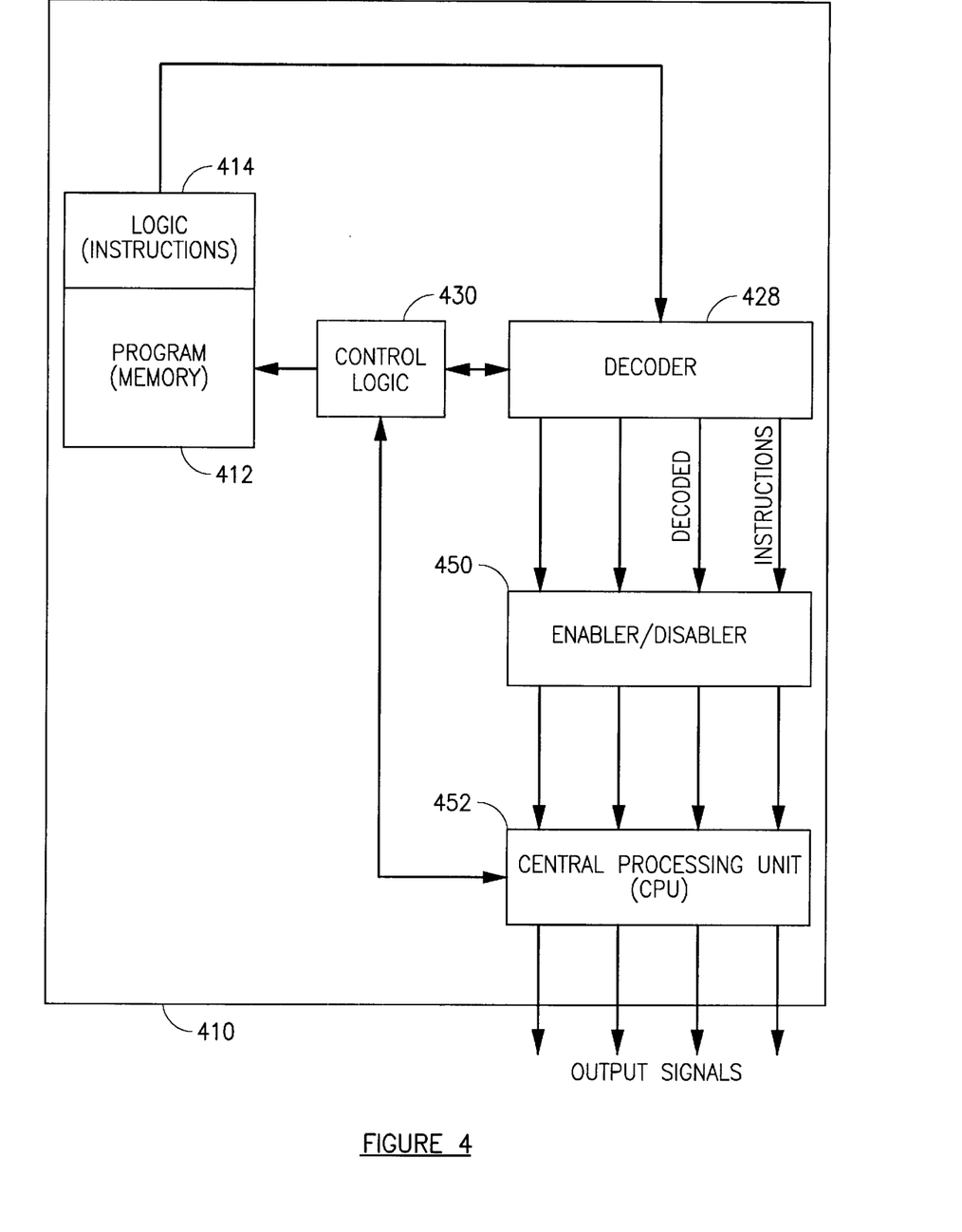
FIG. 4 is a schematic block diagram of a microcontroller of an alternate embodiment of the present invention.

A second alternate embodiment of the present invention is shown in FIG. 4. While the overall arrangement of the alternate embodiment is very similar to the first embodiment, the alternate embodiment has a key difference. In the alternate embodiment, the enabler 450 is arranged in between all of the lines of decoded instruction from the decoder 428 that are input into the CPU 452. Moreover, the enabler 450 is adapted to handle all of the decoded instructions emitted from the decoder 428. This alternate embodiment allows more control over the instructions that are sent to the central processing unit 452 than the preferred embodiment. Alternatively, in still more alternate embodiments of the present invention, any number of decoded instruction lines may be intercepted by the enabler 450.

Figure 5:
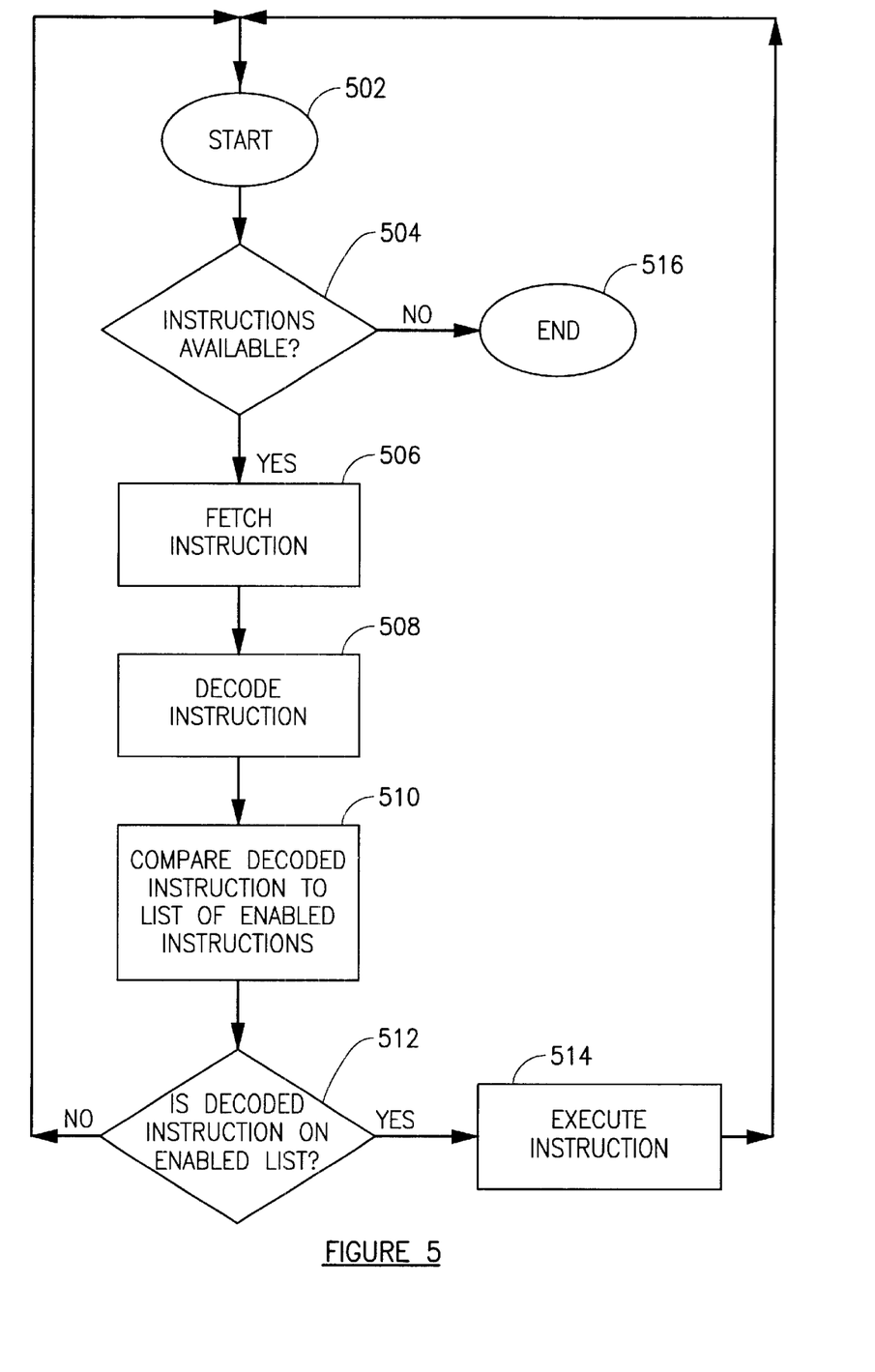
FIG. 5 is a flow diagram of the operation of a microcontroller of an alternate embodiment of the present invention.
Figure 6:
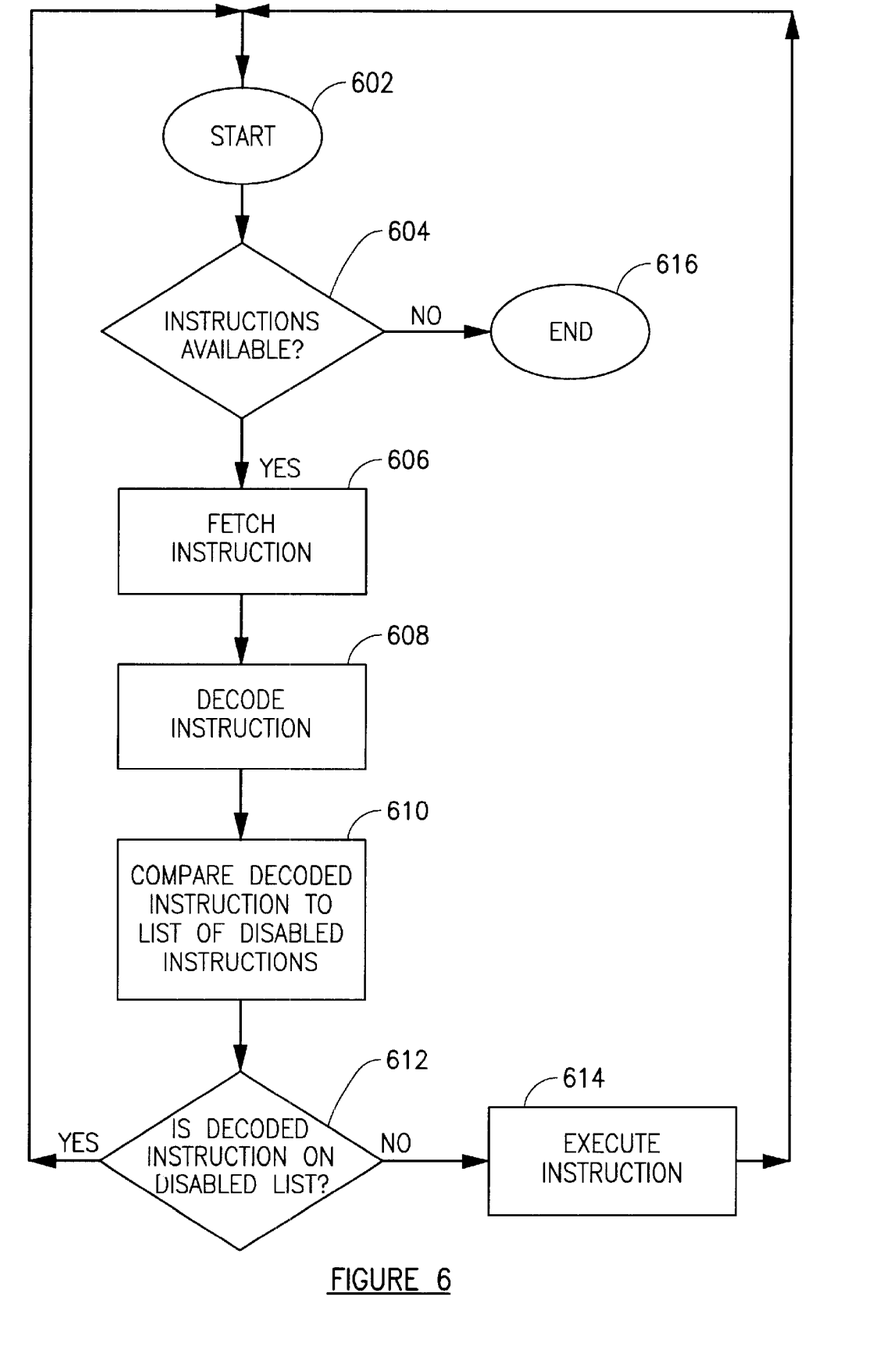
FIG. 6 is a flow diagram of the operation of a microcontroller of an alternate embodiment of the present invention.

The method of operation of example alternate embodiments is illustrated in FIGS. 5 and 6. Referring to FIG. 5 first, the operation begins at step 502. In step 504, a check is made to determine if any instructions are available for potential execution within the program memory. If not, execution ends immediately at step 516, otherwise, the operation continues to step 506. At step 506, the instruction is fetched, either at the behest of the decoder or by the control logic or by some other mechanism known in the art for that purpose. In any case, the decoder decodes the instruction that it receives from the program memory, step 508. In step 510, the decoded instruction is compared to a list of enabled instruction. Next, in step 512, a determination is made on whether the instruction is found on the list of enabled instruction. If so, the instruction is executed in step 514, otherwise, step 502 is repeated. If the instruction is executed, operation is then redirected to step 502.

In an alternate embodiment of the present invention, in step 512, the setting of a status bit would be consulted. If, for example, the status bit is set to ENABLE, then the instruction would be executed in step 514. Otherwise, if the status bit is set to DISABLE, then the operation moves to step 502, effectively disabling the instruction. It should be noted that it does not matter whether an enabled instruction sets the status bit to a particular voltage so long as the enabler is constructed and adapted to interpret the particular voltage correctly.

The method of operation illustrated in FIG. 6 is very similar to that of FIG. 5. However, in this instance, the list contains instructions that are not to be executed. Referring to FIG. 6, the operation begins at step 602. First, in step 604, a check is made to determine if any instructions are available for potential execution within the program memory. If not, execution ends immediately at step 616, otherwise, the operation continues to step 606. At step 506, the instruction is fetched, either at the behest of the decoder or by the control logic or by some other mechanism known in the art for that purpose. In any case, the decoder decodes the instruction that it receives from the program memory, step 608. In step 610, the decoded instruction is: compared to a list of disabled instruction. Next, in step 612, a check is made to determine whether the instruction in question is found on the list of disabled instruction. If so, step 602 is repeated, thereby disabling the instruction, otherwise, the instruction is executed in step 614. If the instruction is executed, operation is then redirected to step 602.

Figure 8:
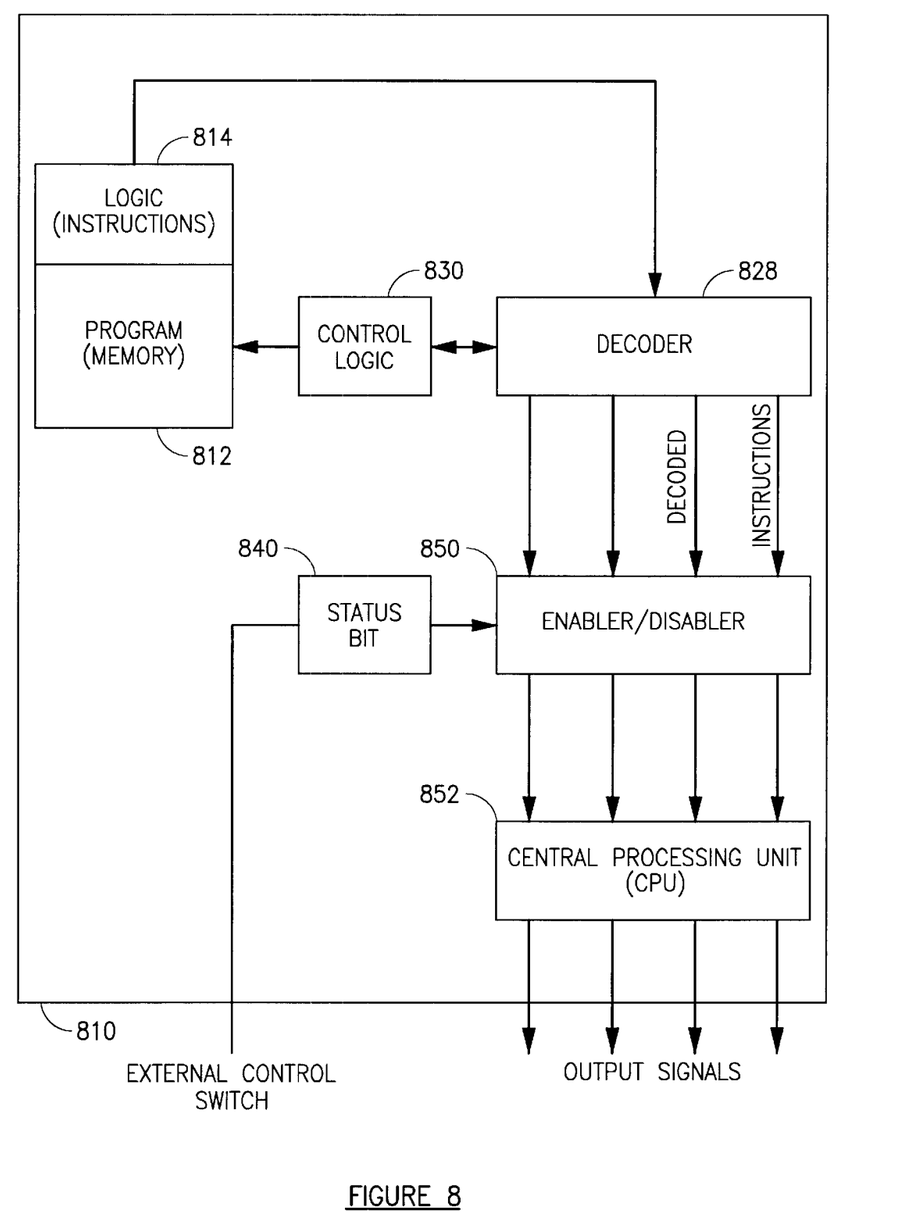
FIG. 8 is a schematic block diagram of the preferred embodiment of the present invention.

The preferred embodiment of the present invention is illustrated in FIG. 8. The microcontroller device 810 contains program memory 812 and logic instructions 814 that are loaded into the decoder 828. In the preferred embodiment, the control logic 830 is connected to, and in operative control, of both the program memory 812 and the decoder 828. The control logic 830 may be programmed for setting the status bit 840 by external controls (not shown) that are manipulated by the user at run-time or, for example, by read only memory (ROM) instructions at startup, or by loading instructions from the program memory 812, or by other methods known in the art of loading instructions into a control logic. However, in the preferred embodiment, the decoder 828 is a programmable logic array (PLA). Decoded instructions are fed into the enabler/disabler 850. Enabled instructions are forwarded to the central processing unit (CPU) 852. The preferred embodiment of the present invention utilizes a register called the status bit 840 that is checked by the enabler upon receiving the decoded instruction. If the status bit is set to ENABLE, then the decoded instruction is forwarded to the central processing unit 352 for execution, otherwise, if the status bit is set to DISABLE, then the decoded instruction is not forwarded to the central processing unit 352, thereby disabling the instruction. The status bit 840 is set or cleared by user software. In operation, that status bit 840 is combined in a boolean "AND" with the output of the decoder 828 for a particular instruction. If the result of the boolean AND is TRUE, (i.e., the status bit 840 is set to 1 or ENABLE) then the instruction is forwarded to the CPU 852 for execution. Otherwise, if the status bit 840 is set to FALSE (i.e., 0 or DISABLE) then the resulting boolean AND must be FALSE and the instruction is disabled and a NOP is executed on the CPU 852. Conversely, the decoder 828 and the status bit 840 may be connected via a boolean NAND such that the instruction will only be executed if the status bit 840 and the decoder 828 output are set to DISABLE. Similarly, other boolean connections (such as OR or NOR) between the status bit 840 and the decoder 828 can be utilized to further modify the behavior of the present invention.

The status bit 840 of the preferred embodiment of the present invention can be a version of one-time programmable fuses in a bank that are input into a control block to enable or disable the outputs of the CPU 852. Another version of the status bit 840 is implemented with a register with "on-the-fly" changable bits. Other implementations of the status bit 840 will become obvious to those skilled in the art upon study of this detailed description of the present invention. Moreover, alternate embodiments of the present invention allow the status bit 840 to be set by an instruction received from the program memory 814 or by an external hardware switch (not shown). The external hardware switch can directly manipulate the control logic 830, the status bit 840, or the enabler 850 or another device within the microcontroller 810 that can manipulate either one of those devices and, ultimately, manipulate the behavior of the present invention.

Figure 7:
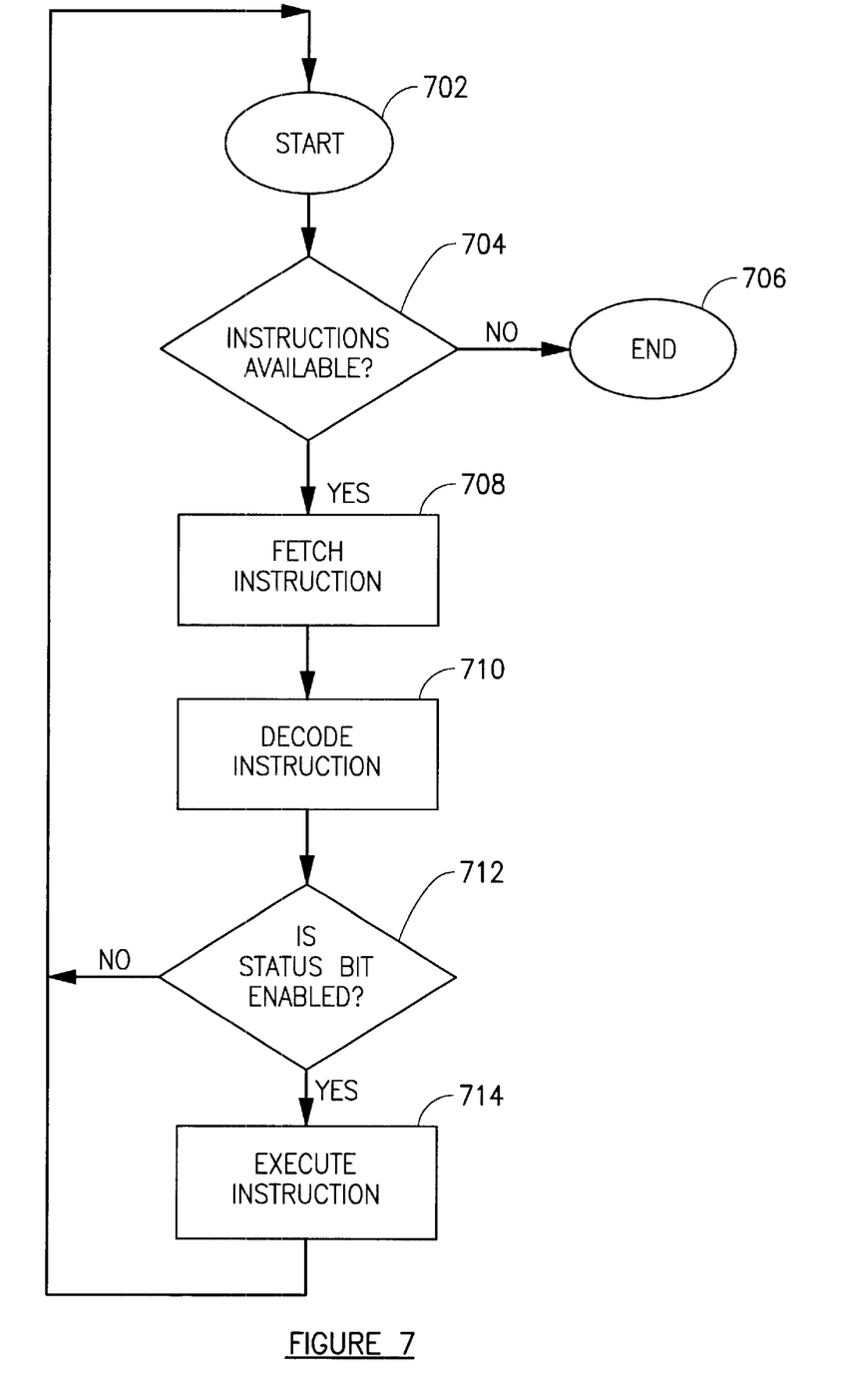
FIG. 7 is a flow diagram of the operation of the preferred embodiment of the present invention.

The operation of the preferred embodiment of the present invention is illustrated in FIG. 7. First, the sequence is started in step 702. Next, a check is made to determine if any instructions are available for potential execution, step 704. If not, the operation is ended in step 706. Otherwise, operation continues to step 708 where the instruction is fetched. Next, the instruction is decoded in step 710. After decoding, a check is made in step 712 to determine if the status bit is enabled. If not, execution loops back to step 702, otherwise, the instruction is executed in step 714.

In yet another alternate embodiment, the status bit 840 is set, for example by the control logic 830 or by the decoder 828. In this example, the control logic 830 receives the same decoded instruction from the decoder 828 as does the status bit 840. Upon receipt of the decoded instruction, the control logic 830 can perform a table lookup to determine if the instruction is contained within an enabled or disabled listing and set the status bit 840 accordingly. As before, the listing can be predefined or it can be manipulated at run-time by appropriate methods. Moreover, it does not matter where the status bit 840 is located, either in the control logic 830, the enabler 850, or another device so long as the enabler 850 can have access to the ENABLE/DISABLE status of the status bit 840 while the decoded instruction resides within the enabler 850. In another example, the status bit 840 can be set within the enabler 850 by bits contained within the, decoded instruction. In that sense, the decoded instruction itself contains the information (characteristics) that determine whether or not the instruction is ultimately executed.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A microcontroller having an instruction set composed of two or more instruction subsets, each of said instruction subsets having a specific functionality, each of said instruction subsets constructed and arranged to be either enabled or disabled to provide selected functionality for said microcontroller, said microcontroller comprising:

program memory, said program memory constructed and arranged to contain at least one coded instruction;

a decoder connected to said program memory, said decoder constructed and arranged to decode said coded instruction fetched from said program memory into a decoded instruction; and an instruction enabler, said instruction enabler constructed and arranged to receive said decoded instruction from said decoder, said instruction enabler further constructed and arranged to determine if said received decoded instruction is present in an enabled instruction subset, said instruction enabler further constructed and arranged to enable execution of said received decoded instruction if said received decoded instruction is included in an enabled instruction subset.

2. The microcontroller of claim 1, wherein said at least one encoded instruction contains encoded instructions from a plurality of instruction sets.

3. The microcontroller of claim 1, wherein said instruction enabler determines if said received decoded instruction is present in an enabled instruction subset with a control logic.

4. The microcontroller of claim 3, wherein said instruction enabler determines if said received decoded instruction is present in an enabled instruction subset with a software program.

5. The microcontroller of claim 3, wherein said instruction enabler determines if said received decoded instruction is present in an enabled instruction subset with at least one hardware switch.

6. The microcontroller of claim 1, wherein said instruction enabler determines if said received decoded instruction is present in an enabled instruction subset with a list contained within said instruction enabler.

7. The microcontroller of claim 6, wherein said list is generated by a software program.

8. The microcontroller of claim 6, wherein said list is generated by at least one hardware switch.

9. The microcontroller of claim 1, wherein said instruction enabler is a status bit.

10. A microcontroller having an instruction set composed of two or more instruction subsets, each of said instruction subsets having a specific functionality, each of said instruction subsets constructed and arranged to be either enabled or disabled to provide selected functionality for said microcontroller, said microcontroller comprising:

program memory, said program memory constructed and arranged to contain at least one coded instruction;

a decoder connected to said program memory, said decoder constructed and arranged to decode said coded instruction fetched from said program memory into a decoded instruction; and an instruction disabler, said instruction disabler constructed and arranged to receive said decoded instruction from said decoder, said instruction disabler further constructed and arranged to determine if said received decoded instruction is present in a disabled instruction subset, said instruction disabler further constructed and arranged to disable execution of said received decoded instruction if said received decoded instruction is included in a disabled instruction subset.

11. The microcontroller of claim 10, wherein said at least one encoded instruction contains encoded instructions from a plurality of instruction sets.

12. The microcontroller of claim 10, wherein said instruction disabler determines if said received decoded instruction is present in a disabled instruction subset with a control logic.

13. The microcontroller of claim 12, wherein said instruction disabler determines if said received decoded instruction is present in a disabled instruction subset with a software program.

14. The microcontroller of claim 12, wherein said instruction disabler determines if said received decoded instruction is present in a disabled instruction subset with a at least one hardware switch.

15. The microcontroller of claim 10, wherein said instruction disabler determines if said received decoded instruction is present in a disabled instruction subset with a list contained within said instruction enabler.

16. The microcontroller of claim 15, wherein said instruction disabler determines if said received decoded instruction is present in a disabled instruction subset with a software program.

17. The microcontroller of claim 15, wherein said instruction disabler determines if said received decoded instruction is present in a disabled instruction subset with at least one hardware switch.

18. The microcontroller of claim 10, wherein said instruction disabler is a status bit.

19. A microcontroller having an instruction set composed of two or more instruction subsets, each of said instruction subsets having a specific functionality, each of said instruction subsets constructed and arranged to be either enabled or disabled to provide selected functionality for said microcontroller, said microcontroller comprising:

program memory, said program memory constructed and arranged to contain at least one coded instruction;

a decoder connected to said program memory, said decoder constructed and arranged to decode said coded instruction fetched from said program memory into a decoded instruction; and an instruction enabler, said instruction enabler having a status bit having an enable setting, said instruction enabler constructed and arranged to receive said decoded instruction from said decoder, said instruction enabler further constructed and arranged to enable one or more of said instruction subsets, said instruction enabler further constructed and arranged to enable execution of said received decoded instruction if said status bit is set to enable.

20. The microcontroller of claim 19, wherein said status bit is set by a control logic.

21. The microcontroller of claim 19 wherein said status bit is set by an instruction received from said program memory.

22. The microcontroller of claim 19, wherein said status bit is set by said decoder.

23. The microcontroller of claim 19, wherein said status bit is set by said program memory.

24. The microcontroller of claim 19, wherein said decoder is a PLA.

25. The microcontroller of claim 24, wherein said status bit is set by said PLA.

26. The microcontroller of claim 19, wherein said status bit is set by an external hardware switch.

27. The microcontroller of claim 20, wherein said control logic is instructed to set said status bit by an external hardware switch.

28. The microcontroller of claim 20, wherein said at least one encoded instruction contains encoded instructions from a plurality of instruction sets.

29. The microcontroller of claim 19, wherein said at least one encoded instruction contains encoded instructions from a plurality of instruction sets.

30. A microcontroller having an instruction set composed of two or more instruction subsets, each of said instruction subsets having a specific functionality, each of said instruction subsets constructed and arranged to be either enabled or disabled to provide selected functionality for said microcontroller, said microcontroller comprising:

program memory, said program memory constructed and arranged to contain at least one coded instruction;

a decoder connected to said program memory, said decoder constructed and arranged to decode said coded instruction fetched from said program memory into a decoded instruction; and an instruction disabler, said instruction disabler having a status bit having a disable setting, said instruction disabler constructed and arranged to receive said decoded instruction from said decoder, said instruction disabler further constructed and arranged to disable one or more of said instruction subsets, said instruction disabler further constructed and arranged to disable execution of said received decoded instruction if said status bit is set to disable.

31. The microcontroller of claim 30, wherein said status bit is set by a control logic.

32. The microcontroller of claim 30, wherein said status bit is set by an external hardware switch.

33. The microcontroller of claim 31, wherein said control logic is instructed to set said status bit by an external hardware switch.

34. The microcontroller of claim 31, wherein said at least one encoded instruction contains encoded instructions from a plurality of instruction sets.

35. The microcontroller of claim 30, wherein said at least one encoded instruction contains encoded instructions from a plurality of instruction sets.

* * * * *